(12) United States Patent
Mamaloukas et al.

(10) Patent No.: US 10,200,440 B2
(45) Date of Patent: Feb. 5, 2019

(54) READING AND WRITING DATA TO A METER THAT MEASURES FLOW OF MATERIAL

(71) Applicant: Natural Gas Solutions North America, LLC, Houston, TX (US)

(72) Inventors: Jason Lee Mamaloukas, Cypress, TX (US); Jeff Thomas Martin, Spring, TX (US); Andrew Logan Perkins, Houston, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 0 days.

(21) Appl. No.: 15/098,584

(22) Filed: Apr. 14, 2016

(65) Prior Publication Data

US 2017/0303069 A1    Oct. 19, 2017

(51) Int. Cl.
| | |
|---|---|
| *H01Q 11/12* | (2006.01) |
| *H04L 29/08* | (2006.01) |
| *H04Q 9/00* | (2006.01) |
| *H04W 4/80* | (2018.01) |
| *G01D 4/00* | (2006.01) |

(52) U.S. Cl.
CPC .......... *H04L 67/02* (2013.01); *G01D 4/004* (2013.01); *H04Q 9/00* (2013.01); *H04W 4/80* (2018.02); *H04Q 2209/43* (2013.01); *H04Q 2209/60* (2013.01)

(58) Field of Classification Search
CPC .................................. G01D 4/002; G01D 5/12
USPC ................. 455/41.1, 41.2, 124, 155.1, 115.4
See application file for complete search history.

(56) References Cited

U.S. PATENT DOCUMENTS

| | | | |
|---|---|---|---|
| 8,249,500 B2 * | 8/2012 | Wilson | G06K 19/0723 235/451 |
| 2007/0190939 A1 | 8/2007 | Abel | |
| 2011/0320243 A1 | 12/2011 | Khan | |
| 2013/0009788 A1 | 1/2013 | Langenberg et al. | |
| 2013/0084801 A1 * | 4/2013 | Royston | G06K 7/015 455/41.1 |
| 2013/0215467 A1 * | 8/2013 | Fein | G06F 3/1204 358/1.15 |
| 2014/0055283 A1 * | 2/2014 | Ching | H04Q 9/00 340/870.02 |

(Continued)

FOREIGN PATENT DOCUMENTS

| | | |
|---|---|---|
| EP | 2 227 033 A2 | 9/2010 |
| GB | 2 452 072 A | 2/2009 |
| WO | 2014/048434 A1 | 4/2014 |

OTHER PUBLICATIONS

Monnier, Olivier, "A Smarter Grid with the Internet of Things," Oct. 2013.

(Continued)

*Primary Examiner* — Tu X Nguyen
(74) *Attorney, Agent, or Firm* — Paul Frank + Collins P.C.

(57) ABSTRACT

A method comprising interposing an interface device in communication with both a terminal and a meter; and using the interface device for, exchanging data with the terminal and the meter using a first protocol and a second protocol, respectively, at least one of which utilizes an RF field; identifying an originating device using the data from each of the terminal and the meter; and generating an output for use over the first protocol or the second protocol in response to the originating device.

6 Claims, 9 Drawing Sheets

(56) References Cited

U.S. PATENT DOCUMENTS

| | | | | |
|---|---|---|---|---|
| 2014/0167978 A1* | 6/2014 | Popa | ................ | G01D 4/006 |
| | | | | 340/870.02 |
| 2014/0339301 A1* | 11/2014 | Angus | ................ | G06Q 40/04 |
| | | | | 235/379 |
| 2015/0195099 A1* | 7/2015 | Imes | ................ | G05B 15/02 |
| | | | | 700/275 |
| 2015/0195394 A1* | 7/2015 | Bietz | ................ | H04M 1/7253 |
| | | | | 455/419 |
| 2015/0345986 A1 | 12/2015 | Yahamoto et al. | | |

OTHER PUBLICATIONS

Ali, Liakot, "Contactless Smart Card Based Prepaid Gas Metering," Jan. 2014, Proceedings of the 2014 Int. Conference on Industrial Engineering and Operations Management.

Extended European Search Report and Opinion issued in connection with corresponding EP Application No. 17166351.1 dated Aug. 18, 2017.

\* cited by examiner

READING AND WRITING DATA TO A METER THAT MEASURES FLOW OF MATERIAL

BACKGROUND

Engineers expend great efforts to evaluate operation of industrial machines. These machines include meters (also, "flow" meters) that are configured to measure flow of materials including solids and fluids (e.g., liquids and gasses). Improvements may address various areas including access and processing of data found on the flow meter. These improvements may increase operating efficiency and reduce capital expenses and operating costs for the machine.

SUMMARY

The subject matter of this disclosure relates generally to flow meters. Of particular interest herein are devices that can communicate with the flow meter and with a computing device. The devices can operate effectively as a hub or link that allow an end user (e.g., a technician) to access data on the flow meter to perform diagnostic and maintenance tasks.

Some embodiments are configured for wired and wireless communication with one or both of the flow meter and the computing device. For the computing device, the embodiments may utilize a web server (and related software) to serve up data for use on or by a web browser. The embodiments may also be configured to generate and receive an RF field, possibly having properties (e.g., wavelength, frequency, etc.) that are consistent with Near Field Communication (NFC) protocols and technologies. A wired connection may be useful to retrieve telemetry data from the flow meter. This feature is useful to verify the operating condition of the meter, often by way of examining and reporting on the accuracy of measurements of flow parameters for the material that flows through the meter.

Use of the interface device offers a number of benefits. RF technology is relatively secure as compared to, for example, wireless infrared communications (IrDA) and related protocols. This technology also makes the data on the flow meter more accessible because the interface device merely needs to be in close physical proximity to the flow meter as compared to the line-of-sight requirements necessary to effectively communicate via IrDA-based devices. Moreover, for the computing device, use of the web server and wireless technologies (e.g., Bluetooth®) can provide the end user a rich, robust user experience with more tools and functionality (via the web browser) to observe and manipulate data, while at the same time allowing the end user more mobility to operate a farther distances away from the flow meter.

Implementations of the embodiments may find use with gas meters and like devices that are a special type of flow meter that are configured to measure a volume of fluid. Utilities often employ gas meters to monitor supply of fuel gas (e.g., natural gas, propane, etc.) for various applications including applications that measure supply of gas to residential, commercial, and industrial consumers. In some designs, gas meters incorporate mechanical components that move in response to flow of the gas through one or more chambers of fixed size. Diaphragm-style gas meters, for example, use a diaphragm (or bellows) that continuously reciprocates in response to flow of the gas. The diaphragm actuates a mechanical linkage that translates the reciprocating motion to other movement (e.g., rotation) to turn dials or like indicators that provide visual indication (or quantification) of gas the consumer uses over time. Use of this mechanical structure to measure the supply accounts for changes in properties of gases, which are particularly sensitive to deviations in temperature, pressure, and like operating conditions.

BRIEF DESCRIPTION OF THE DRAWINGS

Reference is now made briefly to the accompanying drawings, in which.

Figure 1:
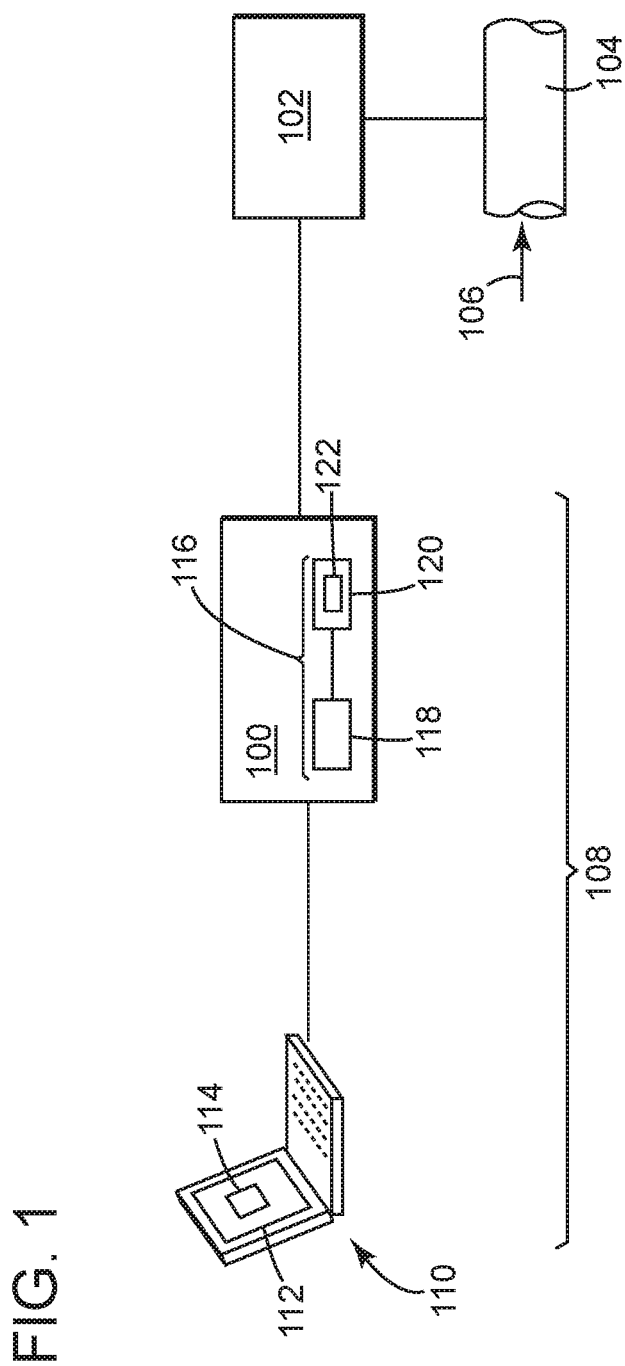
FIG. 1 depicts a schematic, block diagram of an example of an interface device to communicate with a meter that measures flow of material.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes embodiments that can exchange data with a meter. These embodiments allow an end user (e.g., a technician) to communicate with the meter in a way that is convenient, efficient, and secure. As noted below, the embodiments can include an interface device that is configured to exchange data with each of the meter and a computing device. For convenience, this configuration can use wireless protocols (e.g., Near Field Communication (NFC) protocols and Wi-Fi and/or Bluetooth® technologies) for this purpose. A web server disposed at the interface device (e.g., as executable instructions or software) may add functionality, particularly for exchanging data with a web browser and related user interface found on and manipulated by the technician at the computing device. Other embodiments are within the scope of the disclosed subject matter.

FIG. 1 illustrates a schematic diagram of an exemplary embodiment of an interface device 100. The interface device 100 may communicate with a meter 102 to exchange data and signals. The meter 102 can couple with an asset, shown generally as a conduit 104 that can carry material 106. In one implementation, the interface device 100 may operate as part of a system 108 that may include a terminal 110, for example, a computing device with a display 112 that can display a visual interface 114. This computing device may embody a laptop (an example being illustrated in the diagram), tablet, or smart phone; but this device may be any device that an end user (e.g., a technician) can utilize to enter, receive, and visualize data on the display 112. The interface device 100 may itself include computing circuitry 116 that integrates various computing components (e.g., a processor 118 and a storage memory 120). These computing components may be useful to store and execute one or more executable instructions 122 that, in turn, define functionality for the interface device 100.

At a high level, the conduit 104 may be part of a larger system or network that supplies the material 106 to a location. This location can include residential or commercial properties, but the concepts herein may also apply to in industrial processes on a process line. Examples of the material 106 include fluids (e.g., gasses and liquids), although this disclosure does not foreclose use of the meter 102 with moving "solids" (e.g., particles, grains, etc.). Practical applications for the meter 102 may generate data that relates to flow of fuel gas to a customer location. Utility companies can use this data to realize usage at the location and, in turn, to provide an appropriate bill to the customer.

The interface device 100 is configured to exchange data with both the meter 102 and the terminal 110. When interposed between these devices, the interface device 100 can serve as a valuable tool that performs various functions within a single, unitary device. For example, the interface device 100 can function as a configuration tool that allows the end user to access and, importantly, to modify data resident on the meter 102 via the terminal 110. This data may define one or more operating parameters for the meter 102, often as part of a setup or a configuration that regulates operation of the meter 102. The operating parameters may include calibration settings that are set at the time the device is installed at the location. As a diagnostic tool, the interface device 100 can allow the end user to verify operation of the meter 102 in the field. Such functions may require the interface device 100 to access operating data on the meter 102. This operating data may define, for example, values the meter 102 measures for flow volume of the material 106. In turn, the interface device 100 may be configured to compare these values to known telemetry data in order to verify proper operation of the meter 102.

Communication between the interface device 100 and the terminal 110 may use a web browser or like software application. In one implementation, the executable instructions 122 can embody web server software (also a "web server") for data exchange with the terminal 110 via the web browser. This feature expands the functionality of the interface device 100. For example, the web server on the interface device 100 may host applications, programs, and like scripts that configure the visual interface 114 shown on the display 112. Suitable configurations may provide accessible features (e.g., icons, data input blocks, etc.) that the end user can use to modify data resident on the meter 102.

Use of the web server may allow an end user (e.g., a technician) to access the parameter data from a location remote from the meter 102. This feature can permit end user to properly obtain the information on the meter 102 without wires and like physical connections. In one implementation, the web server may serve up the parameter data and other information in a way that configures the visual interface 114. Examples of the visual interface 114 can embody a web browser running as an application on the terminal 110. The terminal 114 can couple with the interface device 100 via a network (wired or wireless, as desired) so that the end user can retrieve data from the interface device 100.

The interface device 100 may also be configured with various short-range communication technologies. These technologies may utilize wireless protocols that facilitate data exchange between the interface device 100, the meter 102, and the terminal 110. Near-field communication (NFC) and Bluetooth® are two examples of suitable wireless protocols, but this disclosure considers other possibilities as well. Generally, useful types of protocols do not require line-of-sight or critical alignment in order for data to transmit between two devices. This feature is beneficial because it merely requires the end user to locate and maintain the interface device 100 relative to the meter 102 within an appropriate operating distance (or range or proximity) defined by the wireless protocol. For NFC devices, this operating distance is approximately 20 cm or less, but is likely device specific.

The interface device 100 may further be configured for secure communication with each of the meter 102 and the terminal 110. These configurations may employ various data encryption techniques that correspond to the respective modality of communication, as necessary. Use of encryption on the interface device 100 can shift security away from the meter 102. This feature can simplify construction of the meter 102 and, moreover, standardize construction of the meter 102 across many different platform and product lines.

Figure 2:
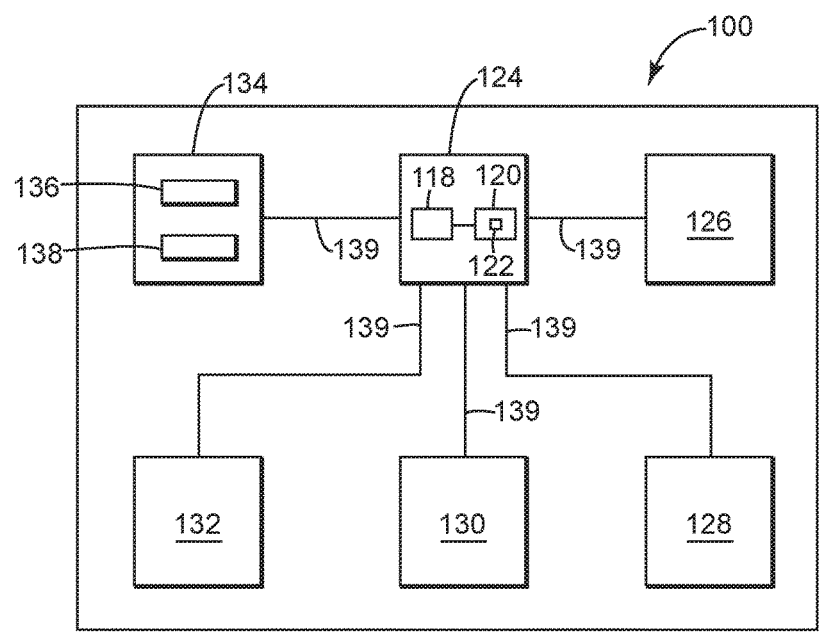
FIG. 2 depicts a schematic diagram of an example of the interface device of FIG. 1.

FIG. 2 depicts a schematic diagram of the interface device 100. The computing components 118, 120 may be part of a controller 124 that can manage functions and operative features of the interface device 100. The controller 124 may embody a microcontroller that is fully-integrated with processing and memory necessary to perform operations. In one implementation, the controller 124 can couple with one or more data interfaces (e.g., a first data interface 126, a second data interface 128, and a third data interface 130). The controller 124 can also couple with a repository 132 like a memory (e.g., storage memory 120) or buffer that can retain data and information. The repository 132 may be set up as RAM, ROM, or like read-only or random access memories. As also shown in FIG. 2, a power supply 134 may be useful to provide electrical signals (e.g., current, voltage, etc.) to energize the computing components of the computing circuitry 116. The power supply 134 may include a power cell 136 and a charge interface 138 that can conduct external signals into the computing circuitry 116. In one implementation, a bus 139 may be useful to exchange signals among components of the interface device 100. The bus 139 may utilize standard and proprietary communication busses including SPI, I²C, UNI/O, 1-Wire, or one or more like serial computer busses known at the time of the present writing or developed hereinafter.

The power supply 134 permits the interface device 100 to operate independently of the meter 102. This feature reduces power load on the meter's internal battery, effectively extending the lifespan of the battery or, at least, focusing its use on requisite functions for the meter 102. Examples of the power cell 136 include batteries, preferably rechargeable, but this is not always necessary. The charge interface 138 can embody a connector that can transmit one or more of a power signal and data signal. Examples the connector includes universal serial bus (USB) connectors, RS-234 connectors, and the like known at the time of the present writing or hereinafter developed. The connector may operate to conduct external power signals, which may be useful to recharge the power cell 136 as well as to supplement the electrical signals from the power cell 136 for use by the interface device 100. For data signals, the connector can also serve to provide a secure, wired connection between the interface device 100 and the meter 102 and terminal 110. Such wired connection may be useful to the executable instructions 122 (or, generally, software and firmware) resident on the interface device 100.

Figure 3:
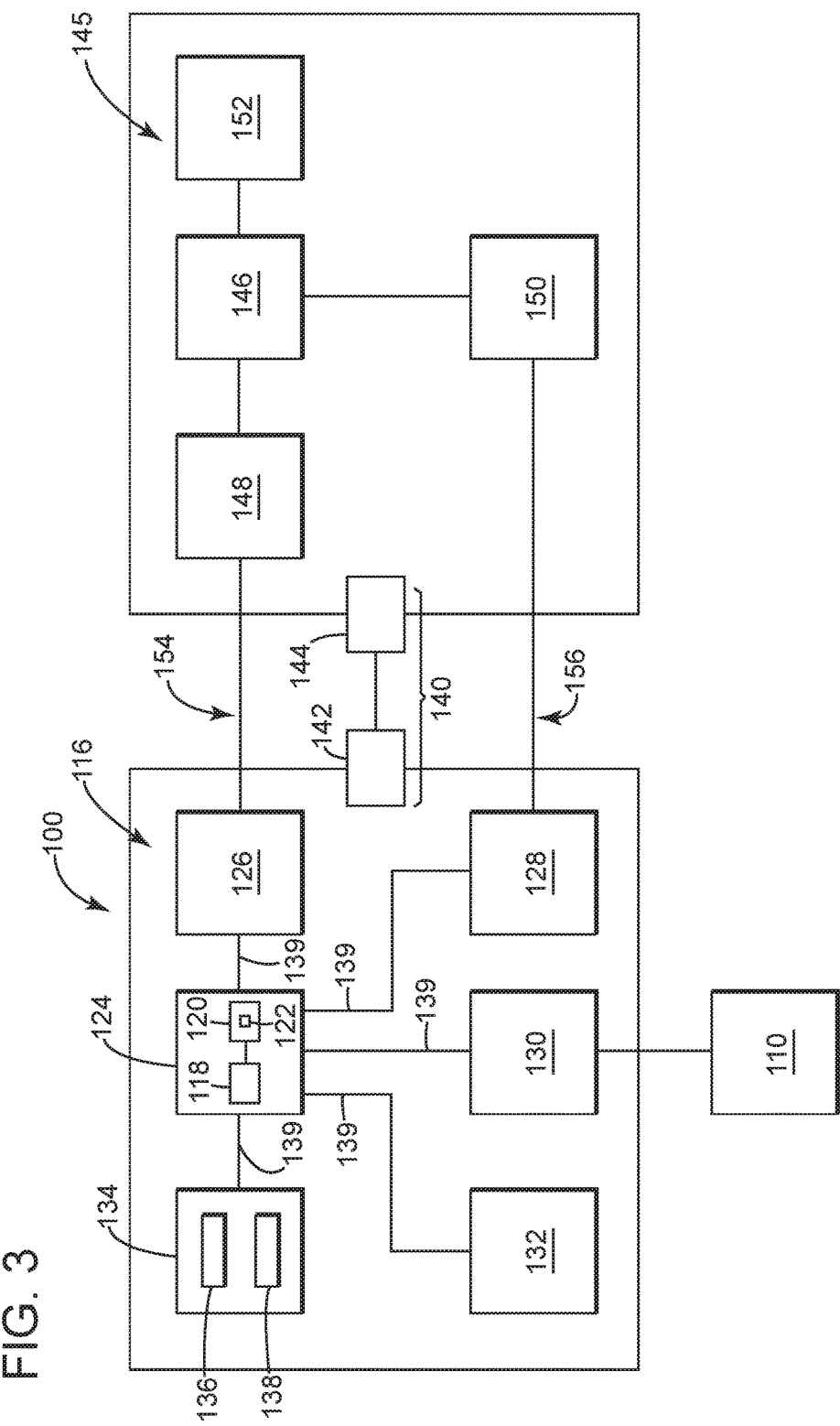
FIG. 3 depicts a schematic diagram of the interface device of FIG. 2 coupled with a meter that measures flow of material.

FIG. 3 depicts the interface device 100 and the meter 102 in one configuration to exchange data. This configuration may use a coupling mechanism 140 to maintain the operating distance D as measured between the interface device 100 relative to the meter 102. The coupling mechanism 140 may have one or more coupling members (e.g., a first coupling member 142 and a second coupling member 144). The coupling members 142, 144 may be disposed on or, in one example, affixed to the device 100 and the meter 102, respectively. At the meter 102, meter circuitry 145 can include a central control 146 that may be useful to perform operations to quantify flow of the material 106 (FIG. 1) through the device. The central control 146 may couple with one or more meter interfaces (e.g., a first meter interface 148 and a second meter interface 150). The central control 146 may also couple with a measurement device 152. This device may embody sensors that can provide data that the central control 146 can use to characterize parameters of the flow. Exemplary parameters may include volume, flow rate, velocity, at the like. In the present example, the data interfaces 126, 128 and the meter interfaces 148, 150 can form a pair of data links (e.g., a first data link 154 and a second data link 156). The data links 154, 156 can be configured for data and signals to transit between the device 100 and the meter 102.

The data links 154, 156 enable communication of data between the interface device 100 and the meter 102. As noted herein, the first data link 154 can utilize near-field communication (NFC) protocols for secure, wireless exchange of data between these devices. Each of the first data interface 126 and the first meter interface 148 can embody active devices, for example, transceivers with one or more transmitters and one more receivers. This construction can activate and deactivate a carrier field, typically RF, to promote data exchange. The second data link 156 may require a physical connection for purposes of communicating the operating data for validating the meter 102. This physical connection may embody a wire or like data conduit that connects the second data interface 128 and the second meter interface 150. In one implementation, each of the interfaces 128, 150 may embody a port or connector that can receive a corresponding connector found on the end of the wire.

Figure 4:
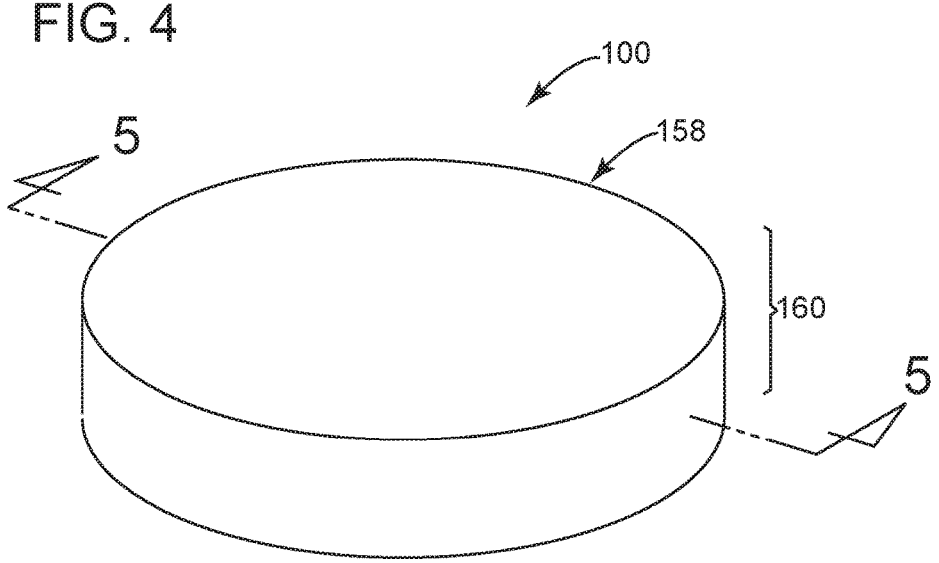
FIG. 4 depicts a perspective view of the top of an example of the interface device of FIGS. 1, 2, and 3.

FIG. 4 provides a perspective view of one construction for the interface device 100 in relation to the meter 102. The interface device 100 may have a body 158 with a form factor that embodies a short, cylindrical device housing 160. The form factor may also incorporate other shapes (e.g., cubes, blocks, spheres, etc.), one or more of which may better satisfy certain application, ergonomic, and aesthetic constraints for the interface device 100. In one implementation, the device housing 160 may be configured so as to exhibit physical properties (e.g., size, weight, shape, etc.) for transport. These configurations can allow an end user (e.g., a technician) to carry the device 100 into the field to interact with the meter 102. In this way, the device 100 is convenient for use on regular service calls or as part of routine maintenance to verify performance of the meter 102.

Figure 5:
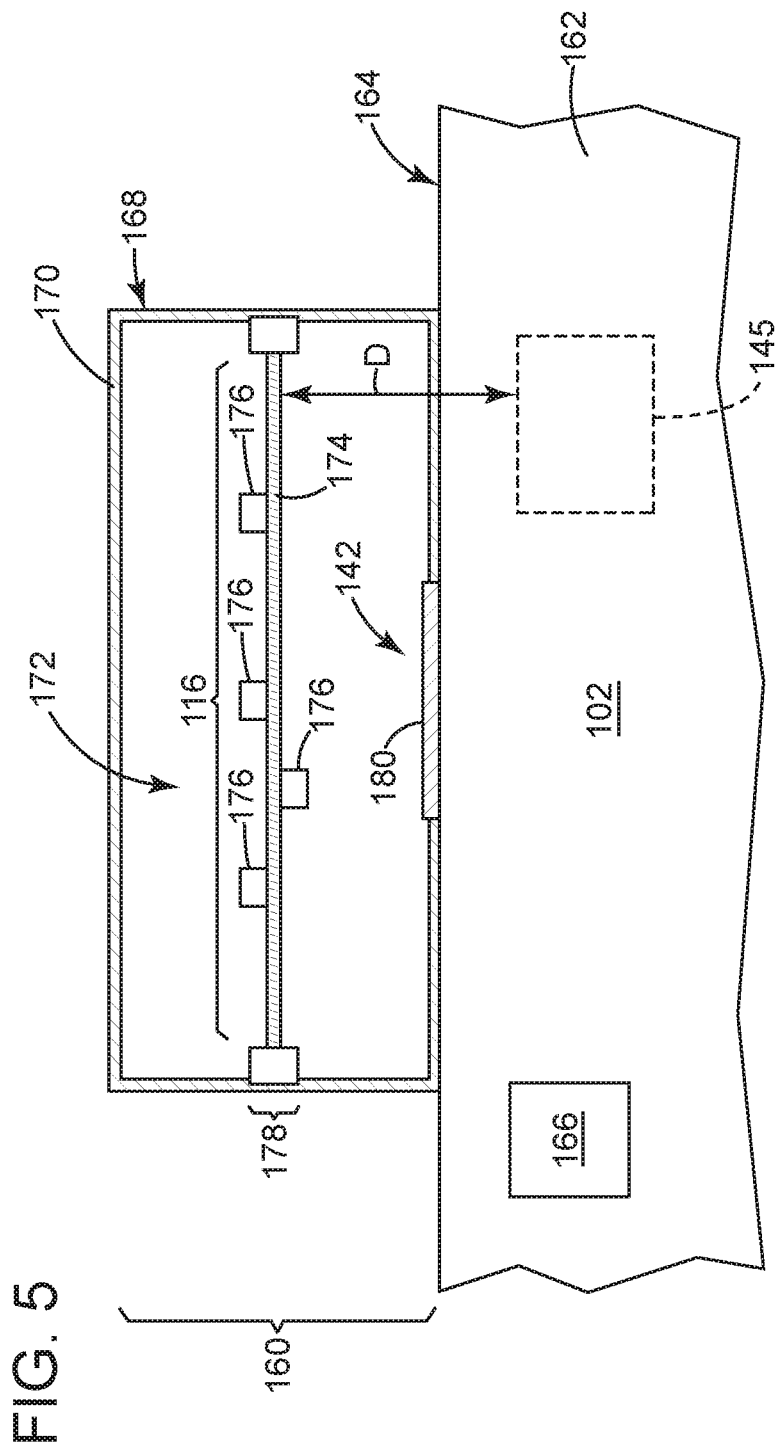
FIG. 5 depicts an elevation view of the cross-section of the interface device of FIG. 4 in proximity to a meter that measures flow of material.

FIG. 5 depicts an elevation view of the cross-section of the interface device 100 in FIG. 4 in position on the meter 102. In this example, the meter 102 has a meter housing 162 with a receiving surface 164. A meter data tag 166 may be disposed on the outside of the housing 162. Examples of the meter data tag 166 may be NFC compatible, preferably having a passive device that stores data that can be read by the first interface device 128 (FIGS. 2 and 3). This data may include configuration, serial number(s), and like identifiers that the interface device 100 can use to properly identify and engage with the meter 102.

The device housing 160 may form an enclosure 168 that can be disposed in contact, in whole or in part, with the receiving surface 164 of the outer housing 162. The enclosure 168 may have a peripheral wall 170 that forms an inner cavity 172. Inside of the enclosure 168, the computing circuitry 116 may utilize a substrate 174 to interconnect (and support) one or more discrete electrical components, identified generally by the numeral 176. The substrate 174 may be secured to the peripheral wall using a securing mechanism 178. At the bottom of the enclosure 170, the first coupling member 142 may comprise a magnet 180 or like device that emits an "attractive" field (e.g., magnetic field). This field may interact with the outer housing 162 to effectively maintain the operating distance D to promote exchange of data and signals between the interface device 100 and the meter 102 via the data link 154 (FIG. 3). The exchange may occur, for example, with the meter circuitry 145 or with the meter data tag 166.

The discrete electrical components 176 may form a topology that embodies functionality of the computing circuitry 116 contemplated herein. For purposes of example, this topology may include transistors, resistors, and capacitors, as well as more complex analog and digital processing components (e.g., processors, storage memory, converters, etc.). The substrate 174 may include traces or conductive paths to appropriately couple the discrete electrical components 176. The substrate 174 may also include flexible printed circuit boards, flexible circuits, ceramic-based substrates, and silicon-based substrates may also suffice. This disclosure does not, however, foreclose use of solid-state devices and semiconductor devices, as well as full-function chips or chip-on-chip, chip-on-board, system-on chip, and like designs.

The peripheral wall 170 may have a thin profile P that defines a cross-section or material thickness for the part. This thin profile P may result from various manufacturing techniques including bending, molding, casting, machining, and additive manufacturing, among many non-exhaustive listings. Selection of these techniques may depend on materials found in the construction of the enclosure 168. Suitable construction might comprise any one or more of metals, plastics, and composites, with particular selection made to satisfy operability, reliability, accessibility, sustainability (in harsh environments), safety, and like considerations for the interface device 100. The peripheral wall 170 may itself be a unitary or monolithic member, although one example preferably allows access into inner cavity 172 by way of multiple pieces (e.g., a top piece and a bottom piece) that affix to one another using fasteners (e.g., screws), adhesives, welds, or other fastening techniques known at the time of the present writing or hereinafter developed.

The securing mechanism 174 may integrate into the construction of the enclosure 168. At a high level, this construction may be useful to prohibit movement of the substrate 174 in the inner cavity 172. This feature can protect the substrate 174 (and discrete electrical components 176) from rapid shock that may result from inadvertently dropping the interface device 100. Physical constraints may be useful for this purpose, although potting material may also be disposed in the enclosure 168 to alleviate impact forces that could frustrate operation of the device. Suitable physical constraints may embody one or more groove or detent features that penetrate into the peripheral wall 170. These features may be sized to receive the substrate 174. In one implementation, the securing mechanism 178 may include a ledge or boss member that extends from the peripheral wall 166 into the inner cavity 168. This boss member may support the substrate 174 and, where applicable, receive a fastener that penetrates through the substrate 174 and into the material of the boss member, the peripheral wall 170, or combination thereof.

The interface device 100 may require service and maintenance to attend to its parts. Over time, these parts may experience wear and, possibly, damage that can frustrate operation of the interface device 100. A technician may need to extract these parts, either in whole or in pieces, to remove existing parts in favor of one or more replacement parts. Examples of replacement parts may be used in place of the housing 160. The replacement parts may originate from an OEM or alternative aftermarket dealer and/or distributor. Examples of the replacement part for the housing 160 may be newly constructed using any of the conventional manufacturing and machining techniques (including additive manufacturing). For certain techniques, a model file that comprises one or more instructions of executable code (on a storage medium and/or downloadable and/or executable) may be used to define the features of the replacement part. These instructions may cause a machine (e.g., a lathe, milling machine, 3-D printing machine) to perform certain functions to result in parts for use in the interface device 100.

This disclosure contemplates that one or more of the replacement for the interface device 100 may be formed by existing parts. For example, the housing 160 and computing circuitry 116 may lend itself to refurbishing and like processes to prepare the existing parts into condition and/or specification for use as the replacement part in the structure. Exemplary subtractive manufacturing processes may include buffing, bead-blasting, machining, and like practices that are useful to build-up and/or remove material from the part, as desired. Exemplary additive manufacturing processes may include 3-D printing with polymers, laser metal sintering, as well as after-developed technology.

The replacement parts may be assembled into the interface device 100 as a wholly-constructed assembly. In other implementations, the replacement parts may embody individual parts (e.g., the housing 160 or its pieces), as well as combinations and compilations thereof, possibly in the form of one or more sub-assemblies.

Figure 6:
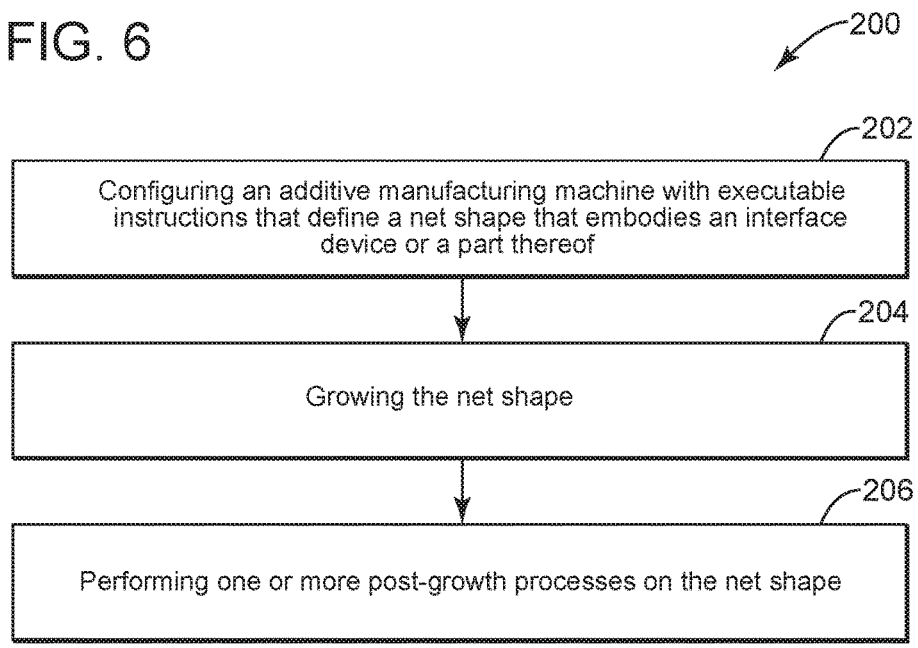
FIG. 6 depicts a flow diagram of an exemplary process to manufacture the interface device of FIG. 4 and other embodiments thereof.

FIG. 6 illustrates an exemplary process 300 to manufacture an example of the support member 100. The exemplary process may leverage additive manufacturing techniques, alone or in combination with one or more other types of subtractive manufacturing techniques. As shown in FIG. 6, the process 200 can include, at stage 202, configuring an additive manufacturing machine with executable instructions that define a net shape. The net shape can embody the interface device 100, in whole or in part, including, for example, configurations of the housing 160 (FIGS. 4 and 5) described hereinabove. The process 200 can also include, at stage 204, growing the net shape and, where necessary, at stage 206, performing one or more post-growth processes on the net shape.

Implementations of the process 300 can render embodiments of the interface device 100. These implementations may result in, for example, an interface device comprising a housing made by the process of configuring an additive manufacturing machine with executable instructions that define a net shape, growing the net shape, and performing one or more post-growth processes on the net shape. Such implementation that result in the interface device are also contemplated wherein the one or more post-growth processes comprises heat treating the net shape, and/or comprises deburring the net shape, and/or comprises machining the net shape, and/or comprises apply a surface finish to one or more surfaces of the net shape, and/or comprises removing material of the net shape using abrasives, and/or comprises inspecting the net shape to accumulate dimensional data and comparing the dimensional data to a default value.

Figure 7:
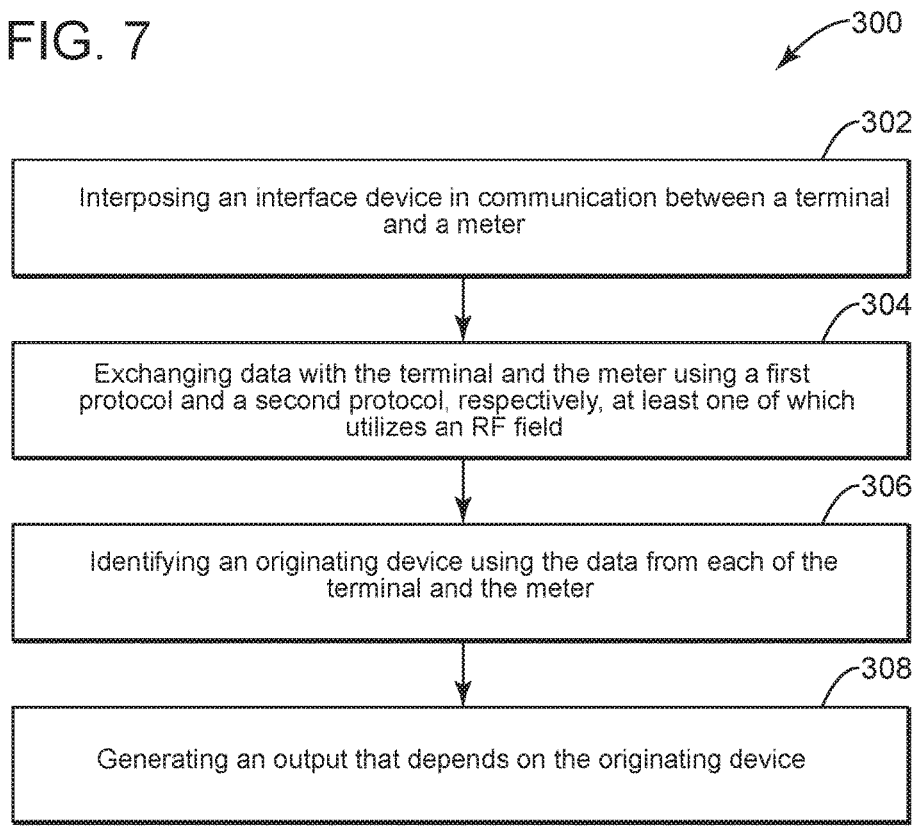
FIG. 7 depicts a flow diagram of an exemplary embodiment of a method for exchanging data with a meter that measures flow of material.

FIG. 7 illustrates a flow diagram of an exemplary embodiment of a method 300 for exchanging data with a gas meter. The method 300 may include, at stage 302, interposing an interface device in communication between a terminal and a gas meter. The method 300 may also include, at stage 304, exchanging data with the terminal and the meter using a first protocol and a second protocol, respectively, at least one of which utilizes an RF field and, at stage 306, identifying an originating device using the data from each of the terminal and the meter. The method 300 further includes, at stage 308, generating an output that depends on the originating device.

At stage 302, the method 300 may interpose the interface device to communicate with both the terminal and the gas meter. This stage may simply require the end user to bring the interface device 100 within a zone that the operating distance defines for the communicating protocols (e.g., NFC protocol). In practice, this zone may form about each of the interface device 100 and the meter 102. The size of the zone, for example, as measured by a diameter, may depend on the type of devices used to generate the signals or field (e.g., RF field) so as to effectuate the exchange of data.

At stage 304, the method 300 may use the proximity of the devices to exchange data. The method 300 may include one or more additional stages for activating or initiating the first data link 154. This "handshake" may occur manually automatically or by way of the end user, e.g., actuating a button on the interface device 100. In one example, the handshake may require both the interface device 100 and the gas meter 102 to transmit, receive, and process the data necessary to properly link with one another in order to continue to exchange additional data.

At stage 306, the method 300 may identify the originating device. This stage may include one or more stages for processing the data to formulate identifying information for the device. This identifying information may correspond with a type of meter, name of meter, or other identifier that can convey to the end user information that is useful to perform the next tasks on the device. This identifier may depend on a serial number, lot number, manufacturer's identification number, one or more of which may be stored at the meter 102 by way of storage or an identifying tag that is, for example, equipped with a transmitting device (e.g., RF device) to communicate with the interface device 100 via the first protocol.

At stage 308, the method 300 may generate an output based on the identity of the originating device. This output may configure the visual interface 114 on the terminal 110. For web browsers, such configurations may present certain data to the end user. This data can inform the end user of the operating properties or operating condition of the meter 102. In practice, this feature can in turn cause the end user to perform certain task like gathering and observing telemetry data, changing configuration data, or updating software and firmware on the operating device.

Figure 8:
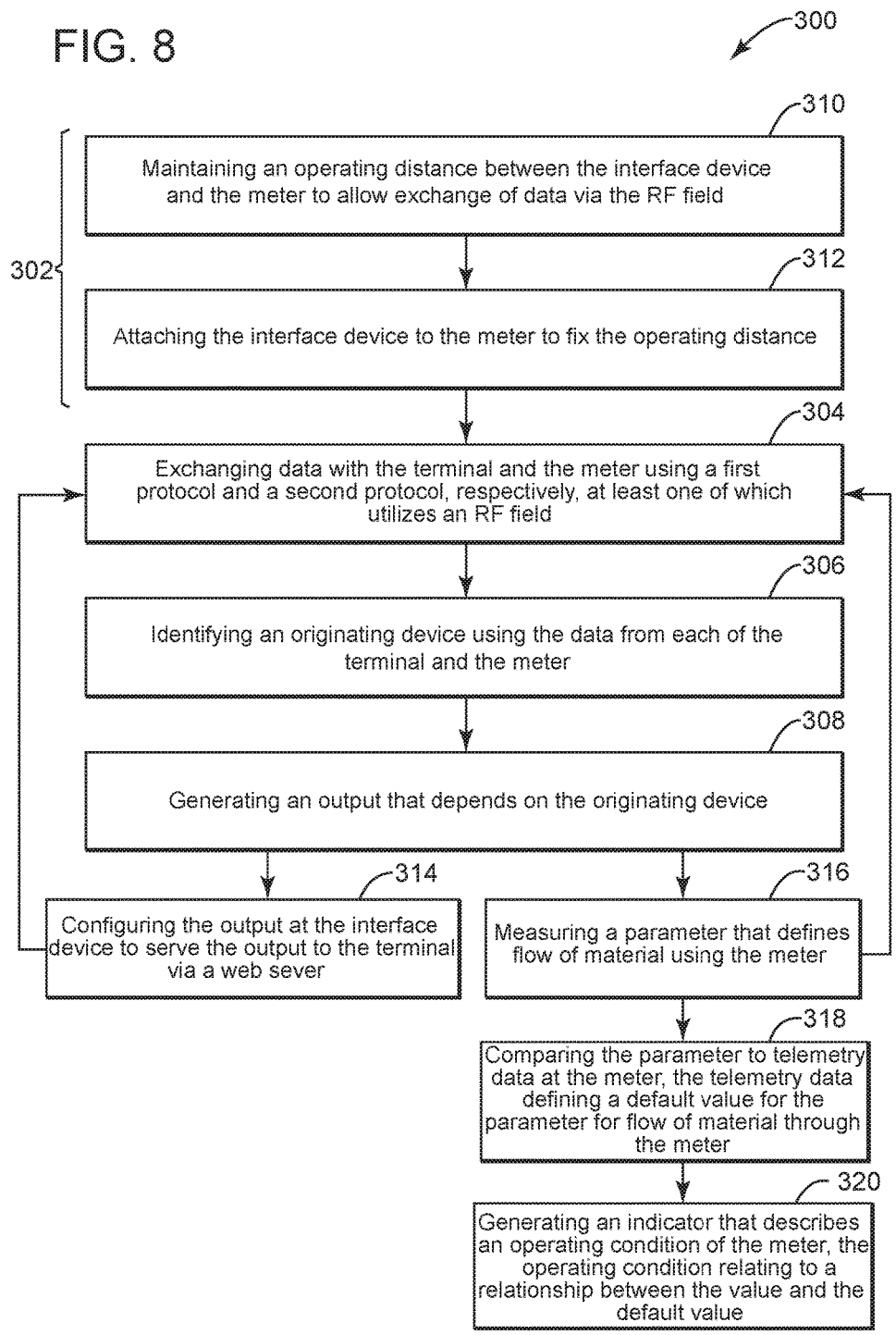
FIG. 8 depicts a flow diagram of additional stages four in the method of FIG. 7.

FIG. 8 illustrates a flow diagram of additional stages for the method 300 to facilitate exchanging data with the gas meter. The method 300 may include, at stage 310, maintaining (or, also, fixing) an operating distance between the interface device and the meter to allow exchange of data via the RF field and, at stage 312, attaching the interface device to the meter to fix the operating distance. The method may also include, at stage 314, configuring the output at the interface device to serve the output to the terminal via a web server. The method 300 may further include, at stage 316, measuring a parameter that defines flow of material using the meter, at stage 318, comparing the parameter to telemetry data at the meter, the telemetry data defining a default value for the parameter for flow of material through the meter, and at stage 320, generating an indicator that describes an operating condition relating to a relationship between the value and the default value.

At stages 310 and 312, the method 300 may maintain the operating distance that is appropriate for the interface device 100 to communicate with the meter 102. These stages may require one or more additional stages for physically positioning the interface device 100 on the meter 102, for example, by placing the magnet 180 in or on the surface 164. Alternative constructions may require the end user to manipulate fasteners, clips, hooks, or like devices on one or both of the interface device 100 and the meter 102. These fastening devices can, in turn, ensure that the interface device 100 is appropriately secured to allow for uninterrupted communication with the meter 100.

At stage 314, the method 300 can serve data to the interface device for visual access by the end user. This stage may utilize the web-server so as to appropriately configure the data for use on a web browser. In one implementation, this stage may include stages for packaging the data in appropriate data formats that use, for example, uniform resource locators (URLs) and like web addresses and indicators in combination with hypertext transfer protocol (HTTP) to complete the requisite exchange of information between the first computing device and the second computing device. For purposes of simplifying calls and outputs between the interface device 100 and the terminal 110, the data formats may conform with representational state transfer ("REST") structure that can use HTTP requests to perform various communication operations that create data, update data, read data, and delete data. This structure offers a lightweight alternative to Remote Procedure Calls and Web Services (e.g., SOAP, WSDL, etc.), among other architectures that are used by conventional data exchange techniques, particularly with respect to diagnostic data from, or about, valve assemblies found on a process line. This lightweight structure simplifies the calls and data requests and outputs that are generated in response to the calls. However, this disclosure does not foreclose use of any particular data format.

At stage 316, the method 300 may measure the parameter that defines material flow through the meter. This parameter may be subject to scrutiny because of local regulations and specifications that demand accuracy for proper billing of consumers by utilities. In this respect, the data exchange for the parameter often occurs via the second data link 156. This feature may require the end user to secure a cable between the interface device 100 and the meter 102, typically by coupling the cable to one or more ports on each of these devices. This modality of data transfer is useful to avoid tampering with data as well as to ensure accurate representation of the volume of material that flow through the meter 102.

At stages 318 and 320, the method 300 may process the data that defines the measured value for the parameter. The default values may be pre-determined and stored in memory. This default value defines that target volume or flow rate that the meter 102 is to measure as part of its functions. By comparing the measured value to this default value, the method 300 can define the relationship and, in turn, understand the operating condition of the meter 102. In one implementation, if the measured value is above or below the default value (often considering some determined tolerance range), then the relationship will indicate that that the meter is not operating properly. The method 300 can then include one or more stages for assigning the indicator to reflect such operating condition. Examples of the indicator may include visual and auditory stimuli (e.g., LEDs, buzzers, etc.).

Figure 9:
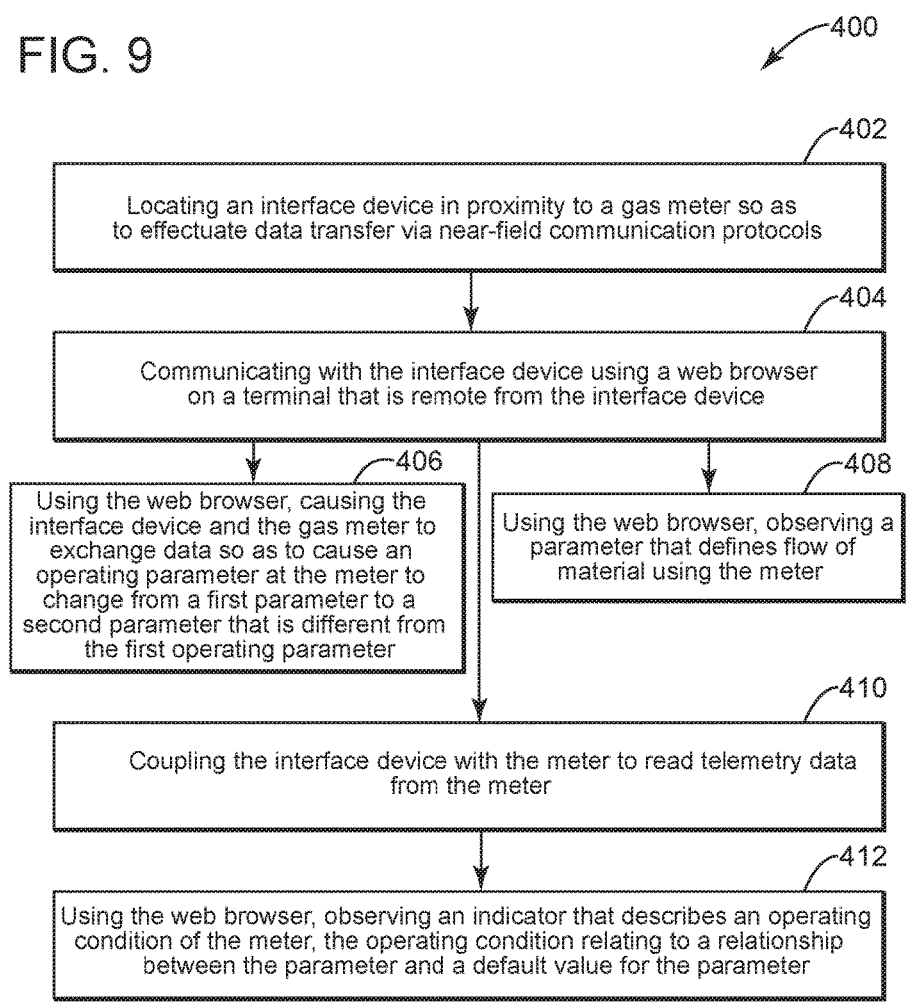
FIG. 9 depicts a flow diagram of an exemplary embodiment of a method for utilizing an interface device to exchange data with a meter that measures flow of material.

FIG. 9 depicts a flow diagram of a method 400 for utilizing the interface device to exchange data. The method 400 may include, at stage 402, locating an interface device in proximity to a gas meter so as to effectuate data transfer via near-field communication (NFC) protocols and, at stage 404, communicating with the interface device using a web browser on a terminal that is remote from the interface device. The method 400 may further include, at stage 406, using the web browser, causing the interface device and the gas meter to exchange data so as to cause an operating parameter at the meter to change from a first parameter to a second parameter that is different from the first operating parameter. In one implementation, the method 400 may include, at stage 408, using the web browser, observing a parameter that defines flow of material using the meter. The method 400 may also include, at stage 410, coupling the interface device with the meter to read the data from the meter and, at stage 412, using the web browser, observing an indicator that describes an operating condition of the meter, the operating condition relating to a relationship between the parameter and a default value for the parameter.

At stage 402, the method 400 locates the interface device proximate the gas meter. This stage may require one or more stages that secure the interface device in position, effectively to fix or maintain the operating distance for proper data exchange to occur via the wireless protocol. In use, the magnet may be useful for this purpose. However, in some implementations, the method 400 may require various stages for manipulating parts of the gas meter or the interface device to secure the operating distance.

At stage 404, the method 400 utilizes the web browser to effect communication with the interface device. For security, the method 400 may include additional stages for entering login information, verifying identification of the interface device, and the like. Such functions may occur via the visual interface of the web browser, as desired.

At stages 406 and 408, the method 400 utilizes the web browser to allow the end user to communicate with the gas meter. This feature can allow the end user to change the configuration of the gas meter, for example, by entering data, downloading software and firmware to the gas meter, and like tasks that may be helpful to sustain or improve operation of the gas meter. This feature can also allow the end user to observe operation of the gas meter. In this way, the end user can perform certain diagnostics that may be useful to avoid potential problems that can frustrate operation of the meter.

At stages 410 and 412, the method 400 can allow the end user to interrogate telemetry data to ensure accuracy and reliability of the gas meter. The method 400 may include one or more stages for fastening a cable to each of the interface device and the gas meter. This cable offers security necessary to avoid improper tampering with the telemetry data during this interrogation. In one implementation, the interface device may be configured to process the telemetry data by, for example, using the telemetry data to calculate a measured valve or like quantifier of the performance of gas meter, comparing the measured value to a known or default value, and determining the deviation between these two values. The web browser may be useful to provide some type of visual indication of the deviation, for example, as an alert the end user when the data indicates the device is not operating within proper bounds.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims In view of the foregoing discussion, the embodiments herein improve diagnostics and maintenance of meters that measure flow of materials. These embodiments can include devices that are configured to utilize RF fields to exchange data with the meter. A technical effect is to allow the end user to change operating parameters of the meter without the need for direct line-of-sight. In this regard, the embodiments may embody hardware including configurations of systems and devices including, for example, devices functionally configured to interact with gas meters to exchange data. The embodiments can also embody methods to configure this hardware to perform certain functions or functionality. The examples below include certain elements or clauses one or more of which may be combined with other elements and clauses to describe embodiments contemplated within the scope and spirit of this disclosure.

What is claimed is:

1. A method, comprising:
    magnetically coupling an interface device to a gas meter so as to effectuate data transfer wirelessly via a first data interface that uses a near-field communication (NFC) protocol;
    concurrently connecting the interface device and the gas meter via a second data interface that uses, which is independent of the first data interface and uses a cable;
    communicating wirelessly with the interface device on a terminal remote from the interface device via a third data interface, which is independent of the first data interface and the second data interface and uses a web server operated by the interface device, the web server permitting use of a web browser on the terminal that is remote from the interface device; and
    using the interface device to modify calibration settings on the gas meter via the web browser by,
        receiving data from the terminal via third data interface and the web server
        receiving, from the gas meter in response to the data from the terminal, identifying information stored on the gas meter via the first data interface in the NFC protocol and flow rate of material through the gas meter via the second data interface over the cable;
        using the identifying information to identify an identity for the gas meter;
        comparing flow rate with a default value for the gas meter;
        generating an output to provide a visual indication on the web browser that defines a relationship between the flow rate and the default value; and
        sending data to the gas meter via first data interface in the NFC protocol in response to data entered at the terminal that reflects the visual indication to modify data resident on the meter so as to cause an operating parameter at the gas meter to change from a first parameter to a second parameter that is different from the first operating parameter.

2. The method of claim 1, further comprising:
    initiating a handshake between the interface device and the gas meter to exchange data between them.

3. The method of claim 1, further comprising:
    configuring the web browser according to the identity.

4. The method of claim 1, further comprising:
    configuring the web browser with data to inform an end user of the operating parameter on the gas meter.

5. The method of claim 1, wherein the identifying information comprises a serial number for the gas meter.

6. The method of claim 1, further comprising:
    storing the identifying information on an RF tag.

* * * * *